United States Patent Office 3,066,534
Patented Dec. 4, 1962

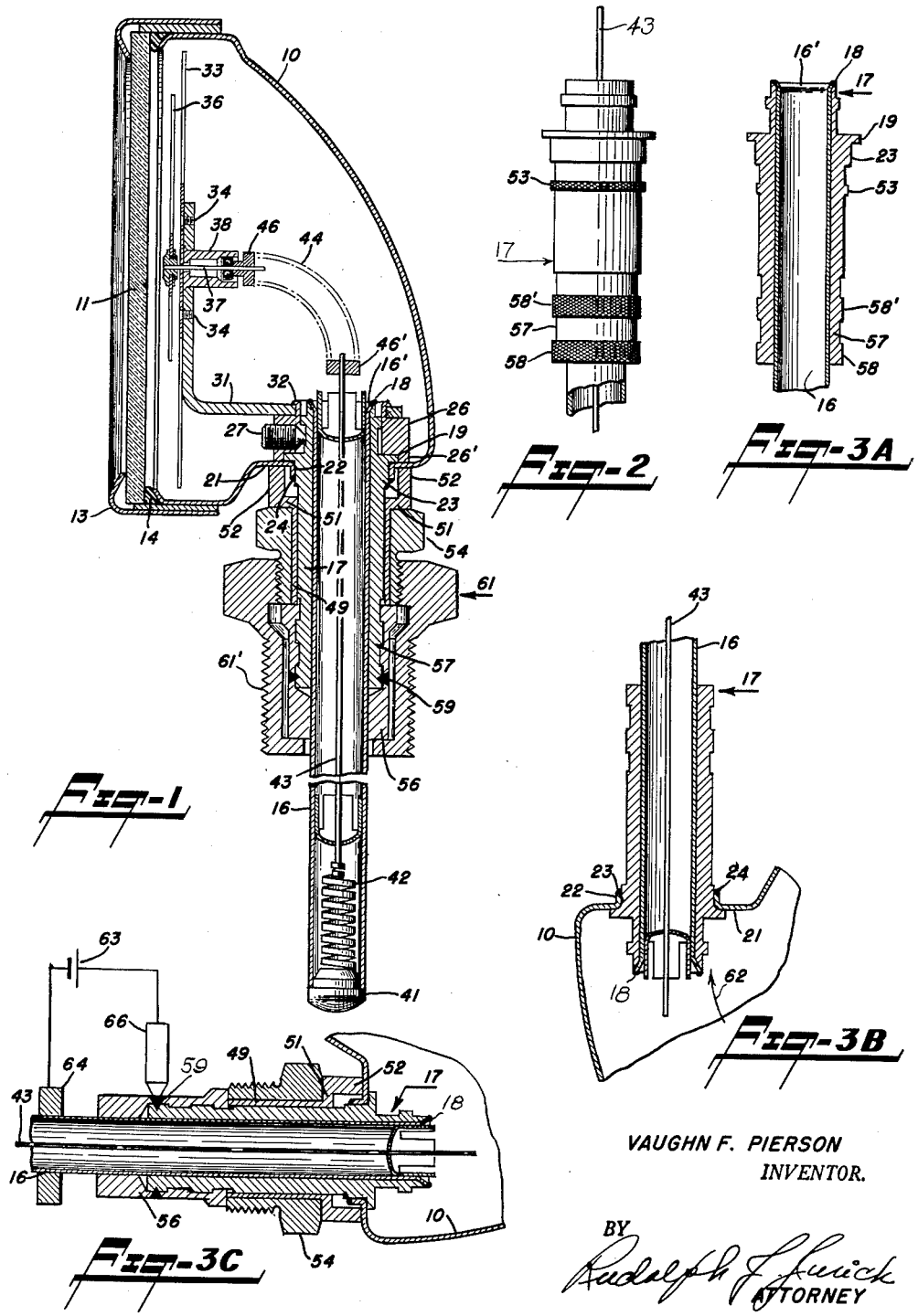

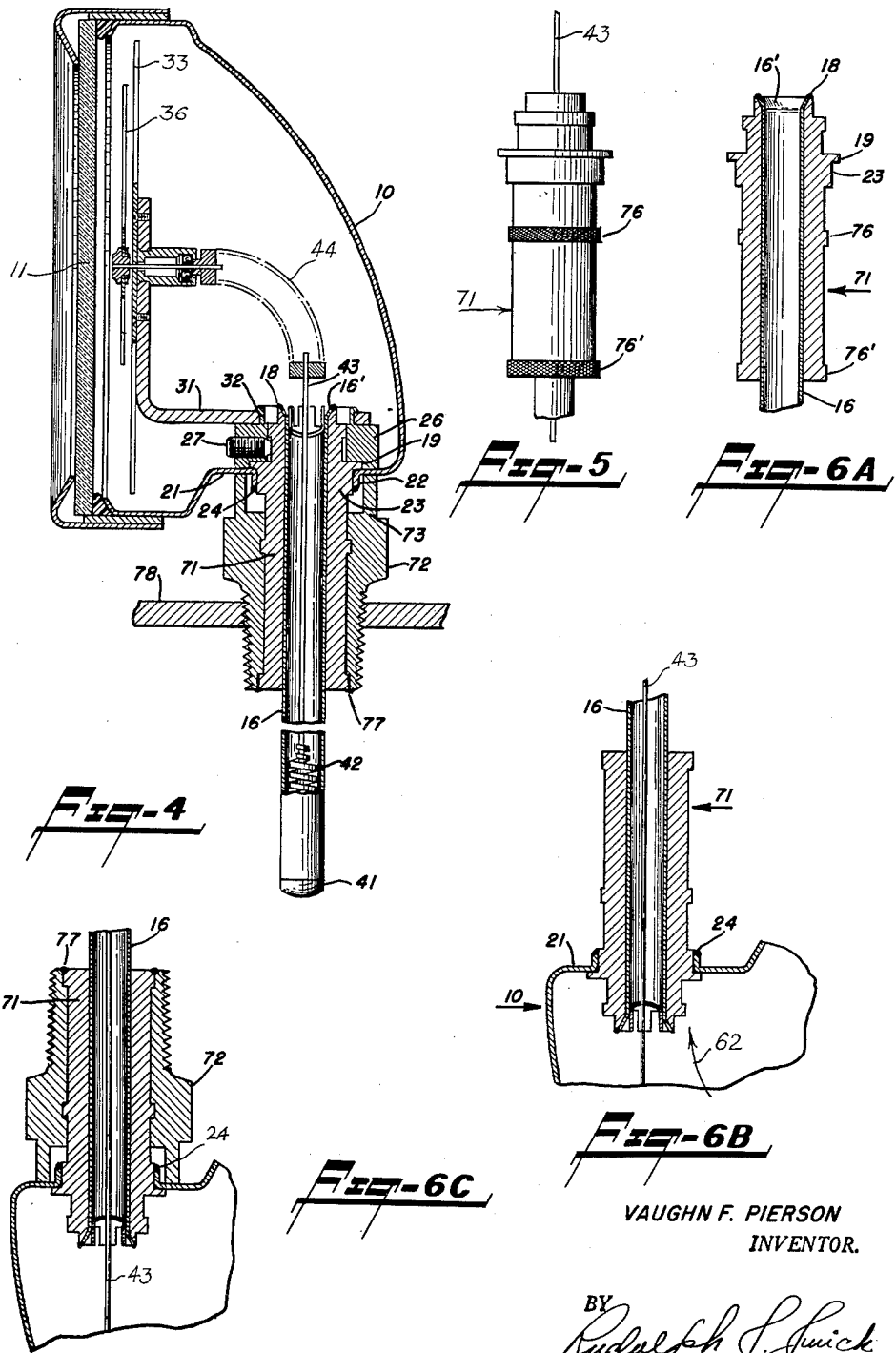

3,066,534
MOUNTING ARRANGEMENT FOR A
THERMOMETER OR THE LIKE
Vaughn F. Pierson, Morristown, N.J., assignor, by mesne assignments, to Daystrom, Incorporated, Murray Hill, N.J., a corporation of Texas
Filed Oct. 22, 1959, Ser. No. 848,057
7 Claims. (Cl. 73—363.7)

This invention relates to threaded coupling means for securing an instrument, or the like, to a support and more particularly to a novel, self-contained connecting means which comprises an integral, non-removable, part of the instrument.

Although my novel connecting means is of general utility, I shall describe the device with specific reference to a bimetallic thermometer. Such thermometer comprises a stem terminating in a head, and disposed within the stem is a bimetallic, temperature-sensitive, coil wound in the form of a helix, which inparts rotation to a shaft that extends through the stem and into the head. A pointer suitably coupled to the shaft cooperates with a suitably calibrated scale to provide a direct indication of the temperature affecting the bimetallic coil. A threaded mounting nut is secured to the instrument head for threaded mounting in a wall, a separate socket, or the like, which mounting nut is fixedly secured thereto in one embodiment of my invention, and rotatably secured thereto in another embodiment thereof. With either arrangement, the mounting nut is not removable from the instrument, and is not, therefore, subject to being mislaid or lost.

In the arrangement of my invention, the stem, head and components of the coupling means are welded together to form a strong, permanent, structure. Further, during the manufacture and assembly of the instrument, all of the welding operations are effected from outside of the instrument head, or case. It will be understood that my invention is of particular utility in straight form instruments as distinguished from the angle form type. By a straight form thermometer, I means a thermometer in which the axis of the stem and the plane of the scale plate, or dial, are in parallel planes, while in an angle form thermometer they are normal to each other. In straight form instruments, as will become apparent in the detailed description hereinbelow, it is extremely difficult to perform a welding function on the coupling arrangement from within the instrument case. Since all welding is effected from outside of the instrument case during the assembly of the instruments embodying the coupling arrangement of my invention, the arrangement is obviously well suited for use in straight form thermometers.

For a rugged shock resistant, coupling arrangement, in addition to welding the case to a suitable hole or sleeve in the connecting arrangement, the case is mechanically clamped between a pair of flanged members included in the novel coupling arrangements. Not only is the connection to the case strengthened by this arrangement, but also the weld joint to the case is hidden from view, thereby enhancing the appearance of the connection.

An object of this invention is the provision of a self-contained connection for securing an instrument, or the like, to a support.

An object of this invention is the provision of a connecting means for straight form thermometers for securing the thermometer to a support, which connecting means includes a welded joint between the case and a suitable sleeve or hub, which joint is covered and thereby hidden from view by a second, coaxial, sleeve or hub which sleeve or hub, also mechanically strengthens the case connection.

An object of this invention is the provision of a rugged, welded, connection for securing a thermometer to a support, which connection is highly shock-resistant.

These and other objects and advantages will become apparent from the following description when taken with the accompanying drawings illustrating the invention. It will be understood, however, that the drawings are for purposes of illustration and are not to be construed as defining the scope or limits of the invention, reference being had for the latter purposes to the claims appended hereto.

In the drawings wherein like reference characters denote like parts in the several views:

FIGURE 1 is a fragmentary longitudinal section view of a straight form thermometer which includes a swivel connection made in accordance with my invention;

FIGURE 2 is a side view of a locating bushing employed in the swivel connection shown in FIGURE 1;

FIGURES 3A–3C are fragmentary sectional views of parts of the thermometer illustrated in FIGURES 1 and 2 and showing the parts in suitable position for different welding operations performed during the assembly of the thermometer;

FIGURE 4 is a fragmentary side view, with parts broken away for clarity, of a straight form thermometer in which another embodiment of the connecting means of my invention is shown, which connecting means includes a threaded mounting nut fixedly secured with respect to the thermometer;

FIGURE 5 is a side view of a locating bushing employed in the embodiment of the invention shown in FIGURE 4; and FIGURES 6A–6C are similar to FIGURES 3A–3C only showing the thermometer parts for the thermometer embodying the fixed-type connection shown in FIGURES 4 and 5.

Reference is first made to FIGURE 1 of the drawings wherein there is shown a thermometer head comprising a case 10 provided with a transparent window 11 of glass, plastic, or other material, which window is fixedly secured over the open end of the case by a clamping ring 13 secured to the case by any suitable means not shown. A resilient gasket 14 between the case and window provides a substantially water-tight seal thereat.

A tubular stem 16 extends through an axial hole in a locating bushing 17 (shown also in FIGURE 2), said stem including an upper flared end 16′ which is welded to the bushing, the welded joint being indicated by the reference numeral 18. The locating bushing 17, is provided with a radial integral outwardly extending flange 19 which abuts the inner side of the generally plane bottom wall of the case 10, as viewed in FIGURE 1, which wall is designated by the reference numeral 21; the locating bushing 17 extending through a hole formed in the said wall. A downward, axially directed, flange 22 is integrally formed on the bottom wall 21 about the hole in said wall, which flange extends outwardly from the case. An enlarged diameter portion 23 formed intermediate the ends of the locating bushing force-fits within the flanged hole in the bottom casing wall, and the case 10 and locating bushing 17 are fixedly secured together by means of a weld, designated 24, between the enlarged diameter portion 23 and the lower free edge of the flange 22.

A generally cylindrical-shaped clamping ring 26 surrounds the locating bushing 17 within the casing 10, and is clampingly secured thereto by a set screw 27 threadedly engaging a tapped hole in the side of the ring, the set screw abutting the locating bushing when tightened to clampingly secure the ring to the locating bushing. The ring member preferably includes an axially-extending flange 26′ which surrounds the radially-extending flange 19 on the locating bushing, the said axial flange abutting the inside of the lower wall members 21 about the hole in the said wall to provide additional mechanical support to the case 10.

A generally L-shaped scale plate mounting bracket 31 is attached to the clamping ring 26 as by spinning the upper reduced diameter portion of the ring over the bracket as at 32. A circular scale plate 33 is secured to the face of the bracket 31 by means of screws 34, 34, threadedly engaging tapped holes in the bracket. The scale plate 33 is disposed a spaced distance behind, and parallel with, the transparent window 11, and carries a graduated scale (not shown) calibrated in temperature values. A pointer 36, for cooperation with the scale on the scale plate, is secured to the end of a staff 37 which, in turn, is rotatably mounted in a bearing supporting structure 38 secured to the bracket 31.

The lower end of the tubular stem 16 is closed by a plug 41 which is suitably welded, or attached thereto. A helical bimetallic coil 42 is secured at one end thereof to the plug 41 as by brazing, soldering or welding. The other end of the bimetallic element is fastened to a staff 43 which extends into the head. A closely-wound flexible coil member 44 couples the staff 43 to the pointer carrying staff 37, the coupling member 44 being connected to the staff ends by means of suitable connecting means 46, 46'. It will be understood, then, that the pointer 36, which cooperates with the scale plate graduations provides a direct reading of the temperature effective at the bimetallic element 42 in the lower end of the stem, rotary movement of the bimetallic element being transmitted through the staff 43, flexible coupling means 44 and the staff 37 to the pointer.

The novel mounting arrangement for the instrument includes a sleeve member 49 which is force-fitted over the locating bushing 17, the upper end of which sleeve is formed with an outwardly extending radial flange 51 which, in turn, has an annular, upwardly extending, axial flange 52 formed at the outer periphery thereof. The top of the flange 52 abuts the bottom surface of the case wall 21 about the mounting hole in the wall to thereby provide additional support to the case 10 which is welded to the locating bushing. As best seen in FIGURE 2, the locating bushing may be knurled, as at 53, to assure a tight, non-rotatable fit between the said sleeve member 49 and locating bushing.

A mounting nut 54, having straight threads formed on the exterior thereof, is rotatably mounted on the sleeve member 49. The mounting nut is held in place on the sleeve member 49 between the flange 51 on the sleeve and one end of an end sleeve 56. The end sleeve 56 is force-fitted over the lower, reduced diameter portion 57, of the locating bushing, the said reduced diameter portion 57 being provided with a pair of knurled surfaces (designated 58, 58'), if desired, to assure a tight fit between the end sleeve and locating bushing. The bore of the end sleeve 56 is provided with an enlarged inner diameter portion which fits the reduced outside diameter of the lower end of the locating bushing, and a smaller inner diameter portion which fits over the stem 16. The annular wall between the different diameter portions of the end sleeve bore may abut the lower end wall of the locating bushing 17 while the upper end wall of the end sleeve 56 is in abutting relation with the lower end wall of the sleeve member 49. The side wall of the end sleeve 56 is relatively thin at the lower extent of the enlarged inner diameter bore portion thereof, and a penetration weld, designated by the reference numeral 59, is made through the said thin wall into the locating bushing at the lower end of the said locating bushing, the penetration weld being made into the bottom knurl 58 if the said locating bushing includes such knurl. The penetration weld preferably extends about the entire periphery of the end sleeve.

The outside diameter of the end sleeve 56 is smaller than the threaded shank portion of the mounting nut, whereby, it will be apparent that the mounting nut 54 may be threaded tightly into a cooperating hole formed in a well 61, for example. Upon tightening the mounting nut 54, the lower end of the end sleeve 56 abuts the bottom of well 61 whereby the thermometer is prevented from rotating within the well. The well, in turn, is provided with an external threaded shank portion 61' for mounting the assembly in a suitably threaded aperture. The well 61 construction is well known and forms no part of my invention.

Reference is now made to FIGURES 3A–3C of the drawings wherein the thermometer of FIGURE 1 is shown in various stages of production, at which stages the welding processes involving welding to the locating bushing are performed. The first weld involving the locating bushing 17 involves the weld 18 for securing the stem 16 to the said bushing. (See FIGURE 3A.) Such weld is performed prior to the assembly of the case 10 onto the bushing. It will be apparent, then, that a weld 18 between the flared end of the stem and the upper end of the locating bushing is easily effected about the entire circumference of the junction therebetween. The second weld involving the locating bushing 17 comprises the weld 24 between the case 10 and the said bushing. As seen in FIGURE 3B, the locating bushing 17 with the stem 16 welded thereto, is inserted through the mounting hole in the bottom wall 21 of the case, the locating bushing being inserted through the said hole from inside the case in the direction of the arrow 62. The parts are preferably inverted as shown in FIGURE 3B, and the weld 24 effected about the entire circumference of the flange 22 on the case and the locating bushing. After assembling the sleeve member 49, mounting nut 54, and end sleeve 56 on the locating bushing the penetration weld 59 is easily effected as illustrated wherein current from a suitable welding source of current 63 is shown conducted to the end sleeve through a clamping fixture 64 and a suitable welding electrode 66; the current between the thin-walled portion of the end sleeve and the locating bushing adjacent the welding electrode 66 being of sufficient density to effect the penetration weld. The electrode and thermometer are relatively rotated to provide a penetration weld extending about the entire circumference of the end sleeve and locating bushing.

Another embodiment of the mounting arrangement of my invention is shown in FIGURES 4–6C of the drawings wherein a non-swivel type mounting is illustrated. In the non-swivel type arrangement, the mounting nut is fixed relative to the instrument case, rather than being relatively rotatable therewith. As seen in FIGURE 4, the stem 16 extends through an axial bore in a locating bushing 71 (which is shown also in FIGURE 5) the flared upper end 16' of the stem being welded to the locating bushing as indicated at 18. The upper portion of the locating bushing 71 is of the same construction as the corresponding portion of the locating bushing 17 shown in FIGURES 1 and 2. That is, the locating bushing 71 includes a radial, outwardly extending flange 19 which abuts the inner side of the generally plane bottom wall 21 of the case 10. Also, the casing flange 22 force-fits over the enlarged diameter portion 23 on the locating bushing 71 and is welded thereto as indicated by reference numeral 24, with the flange 19 serving as a back-up member for the case, as mentioned above.

A clamping ring 26, with its attached scale plate mounting bracket 31, is secured to the said locating bushing 71 by the set screw 27 in the manner of FIGURE 1. The scale plate, pointer, transparent window and the front portion of the casing 10 are not described for FIGURE 4, it being understood that the construction thereof may be the same as illustrated in FIGURE 1.

The novel fixed-connection arrangement of FIGURE 4 includes a mounting nut 72 having an axially extending annular flange 73 formed at the upper end thereof, the end of which flange abuts the bottom of the wall 21 about the mounting hole therein to provide added mechanical support to the case 10. In addition, as with the swivel mounting of FIGURE 1, the weld joint 24 between the case and locating bushing is hidden from view. The mounting nut 72 is force-fitted over the locating bushing, which bushing may be provided with knurled surfaces 76 and 76', as shown in FIGURE 5, if desired, to enhance the tightness of the fit. It will here be understood that knurled surfaces on the locating bushing of either of the illustrated embodiments of the invention are obviously not necessary. In FIGURE 4, the mounting nut 72 is welded to the locating bushing at the bottom end thereof by means of a butt weld indicated by the reference numeral 77. With the mounting nut tightly threaded into a cooperating hole in the wall 78, for example, the butt weld 77 is hidden from view. It will be seen, then, that in use, no welds are visible in the connecting means shown in FIGURE 4.

Reference is now made to FIGURES 6A–6C wherein the various welds involving the said locating bushing 71 are shown. As seen in FIGURE 6A, the stem 16 is first welded to the locating bushing in the same manner as illustrated in FIGURE 3A and described above. Next, as shown in FIGURE 6B, the locating bushing 71 with the stem 16 is inserted through the mounting hole in the case in the direction of the arrow 62, and welded as at 24 while in the inverted position illustrated. The mounting nut is placed over the locating bushing, as shown in FIGURE 6C, and the butt weld 77 is effected. As in the swivel-connection embodiment, no welding on the connecting means is performed within the case.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. In a straight form thermometer of the type which includes a case open at one end thereof and means forming a stem-receiving hole at the bottom thereof through which a stem extends, the plane of the open end of the case extending generally parallel to the axis of the stem in the assembled condition of the stem and case; an arrangement for securing the stem to the case comprising, a locating bushing provided with an axial bore within which the stem is fixedly secured prior to insertion of the stem and bushing through the hole formed in the bottom of the case, the said locating bushing having a radially extending annular back-up flange formed thereon, the said stem and attached locating bushing being insertable into the hole formed in the case from inside the case with the said back-up flange on the locating bushing in abutting relation with the inside wall of the case about the hole formed therein, means outside the case welding the locating bushing to the case about a hole formed therein, and a member having an axial bore within which the locating bushing extends, the said member being formed with an axially extending flange which surrounds the means welding the locating bushing to the case and which abuts the case at the outside thereof for additional mechanical support of the case to the locating bushing connection.

2. The invention as recited in claim 1 wherein the said member comprises a mounting nut which terminates adjacent the bottom end of the locating bushing, and means butt welding the mounting nut to the locating bushing at the bottom ends thereof.

3. The invention as recited in claim 1 wherein the said member comprises a sleeve fixedly secured to the said locating bushing, a mounting nut rotatably mounted on the said sleeve, and an end sleeve fixedly secured by a penetration weld therethrough to the locating bushing and preventing the removal of the mounting nut from the said first-mentioned sleeve.

4. In a straight form thermometer of the type which includes a case open at one end thereof and means forming a stem-receiving hole at the bottom thereof through which a stem extends, the plane of the open end of the case extending generally parallel to the axis of the stem in the assembled condition of the stem and case; an arrangement for securing the stem to the case comprising, a locating bushing provided with an axial bore within which the stem is fixedly secured prior to insertion of the stem and bushing through the hole formed in the bottom of the case, means forming an axial outwardly extending annular flange at the said hole formed in the case, the locating bushing having a radially extending back-up flange formed thereon, the said stem and attached locating bushing being insertable into the flanged hole formed in the case from inside the case with the said back-up flange on the locating bushing in abutting relation with the inside wall of the case about the hole formed therein and the said locating bushing in force-fitted connection with the flanged hole formed in the case, means outside the case welding the locating bushing to the free end of the flange formed on the case, a member having an axial bore within which the locating bushing is secured, the said member being formed with an axially extending flange which surrounds the means welding the locating bushing to the case and which abuts the case at the outside thereof for additional mechanical support of the case to locating bushing connection.

5. The invention as recited in claim 4 wherein the said member comprises a mounting nut which terminates adjacent the bottom end of the locating bushing, and means butt welding the mounting nut to the locating bushing at the bottom ends thereof.

6. The invention as recited in claim 4 wherein the said member comprises a sleeve, a mounting nut rotatably mounted on the said sleeve, and an end sleeve welded to the said locating bushing and preventing the removal of the said mounting nut from the first-mentioned sleeve.

7. The invention as recited in claim 6 wherein the said end sleeve includes a thin-wall portion, the said end sleeve being welded by a penetration weld through the said thin wall portion to the said locating bushing.

References Cited in the file of this patent

UNITED STATES PATENTS

| | | |
|---|---|---|
| 1,890,006 | Swift | Dec. 6, 1932 |
| 2,243,733 | Ford | May 27, 1941 |
| 2,271,193 | Hohmann | Jan. 27, 1942 |
| 2,382,888 | Levy | Aug. 14, 1945 |
| 2,499,779 | Ray | Mar. 7, 1950 |
| 2,523,691 | Fitch | Sept. 26, 1950 |
| 2,817,968 | Schmitz | Dec. 31, 1957 |